United States Patent
Marupaduga

(10) Patent No.: US 11,924,777 B2
(45) Date of Patent: *Mar. 5, 2024

(54) LIMITING TRANSMIT POWER IN DENSE HETEROGENEOUS NETWORKS

(71) Applicant: T-Mobile Innovations LLC, Overland Park, KS (US)

(72) Inventor: Sreekar Marupaduga, Overland Park, KS (US)

(73) Assignee: Sprint Spectrum LP, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/933,652

(22) Filed: Sep. 20, 2022

(65) Prior Publication Data

US 2023/0016489 A1    Jan. 19, 2023

Related U.S. Application Data

(63) Continuation of application No. 17/060,678, filed on Oct. 1, 2020, now Pat. No. 11,496,971.

(51) Int. Cl.
| | |
|---|---|
| *H04W 52/24* | (2009.01) |
| *H04W 52/14* | (2009.01) |
| *H04W 52/28* | (2009.01) |
| *H04W 52/36* | (2009.01) |

(52) U.S. Cl.
CPC ....... *H04W 52/244* (2013.01); *H04W 52/146* (2013.01); *H04W 52/283* (2013.01); *H04W 52/367* (2013.01)

(58) Field of Classification Search
CPC ............ H04W 52/244; H04W 52/146; H04W 52/283; H04W 52/367
See application file for complete search history.

(56) References Cited

U.S. PATENT DOCUMENTS

| | | | |
|---|---|---|---|
| 10,368,321 B1 * | 7/2019 | Sitaram ............ | H04W 28/0289 |
| 10,555,315 B1 | 2/2020 | Mansour et al. | |
| 10,834,685 B1 * | 11/2020 | Singh ................. | H04W 52/245 |
| 2008/0188253 A1 | 8/2008 | Chong et al. | |
| 2011/0164514 A1 * | 7/2011 | Afkhamie ........... | H04W 52/367 370/252 |
| 2014/0105040 A1 | 4/2014 | Baker et al. | |
| 2016/0099769 A1 | 4/2016 | Moffatt et al. | |
| 2016/0278101 A1 * | 9/2016 | Soldati ............. | H04W 72/0453 |
| 2016/0309374 A1 | 10/2016 | Shu et al. | |

* cited by examiner

*Primary Examiner* — John J Lee
(74) *Attorney, Agent, or Firm* — Jones Robb, PLLC

(57) ABSTRACT

Dynamically limiting uplink transmit power of wireless devices that are known to be within range of a dense cluster or quantity of access nodes. Wireless devices can report identifiers of nearby access nodes. Responsive to determining a large quantity of identifiers from a wireless device in a specific location, the maximum allowable transmit power of the wireless device (or other wireless devices in the same area) can be reduced. Power can be reduced for HPUEs as well as LPUEs.

13 Claims, 8 Drawing Sheets

LIMITING TRANSMIT POWER IN DENSE HETEROGENEOUS NETWORKS

This patent application is a continuation of U.S. patent application Ser. No. 17/060,678, filed on Oct. 1, 2020, which is incorporated by reference in its entirety for all purposes.

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or distributed or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| | Power Class 1 Wireless Device | | Power Class 2 Wireless Device | | Power Class 3 Wireless Device | | Power Class 4 Wireless Device | |
|---|---|---|---|---|---|---|---|---|
| Operating Band | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices can be configured with a maximum allowable transmit power level of +23 dBm for frequency bands I-III with a nominal power tolerance of ±2 dB (e.g., for E-UTRA bands). High-power class wireless devices are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Because high-power class wireless devices are capable of transmitting at a maximum allowable transmit power that is higher than lower-power class wireless devices, there are potential uplink interference concerns when too many wireless devices are utilizing maximum allowable transmit power when it is not needed. In particular, high transmit power is useful when wireless devices are distant from access nodes, or when very few access nodes are available within range of high powered wireless devices, and may not be useful when the density of access nodes is high.

OVERVIEW

Exemplary embodiments described herein include methods, systems, and processing nodes for limiting power in dense heterogeneous networks to avoid uplink interference and minimize noise levels. An exemplary method for mitigating interference in heterogeneous networks includes monitoring a density of access nodes within range of one or more wireless devices, and adjusting a maximum allowable transmit power of the one or more wireless devices based on the density of access nodes.

Another exemplary method for limiting transmit power of wireless devices in dense heterogeneous networks includes determining that a wireless device is within range of a threshold quantity of access nodes, and limiting a maximum allowable transmit power of the wireless device.

As described herein, the power is adjusted for high powered wireless devices first, then for low powered wireless devices. Thus, another exemplary method for limiting transmit power based on a density of access nodes in a wireless network includes identifying a high powered wireless device in a wireless network, determining that a quantity of access nodes within range of the high powered wireless device meets a threshold, and reducing a maximum allowable transmit power of the high powered wireless device.

Another exemplary method for limiting uplink interference includes monitoring a density of access nodes within range of a wireless device, and upon the density meeting a threshold, reducing a maximum allowable transmit power of the wireless device. The maximum allowable transmit power may be reduced based on a capability of the wireless device, i.e. whether the wireless device is a high powered wireless device, or a standard powered (or low powered) wireless device.

These exemplary operations described herein may be performed by a processing node within a system, such as a telecommunication system. For example, an exemplary system for limiting power in dense heterogeneous networks includes at least a processing node and a processor coupled to the processing node. The processing node can be configured to perform operations including any of the operations described herein in any combination.

For example, an exemplary processing node can be configured to perform operations including monitoring a density of access nodes within range of one or more wireless devices, and adjusting a maximum allowable transmit power of the one or more wireless devices based on the density of access nodes. In another exemplary embodiment, the processing node can be configured to perform operations including determining that a wireless device is within range of a threshold quantity of access nodes, and limiting a maximum allowable transmit power of the wireless device.

DETAILED DESCRIPTION

Figure 1:
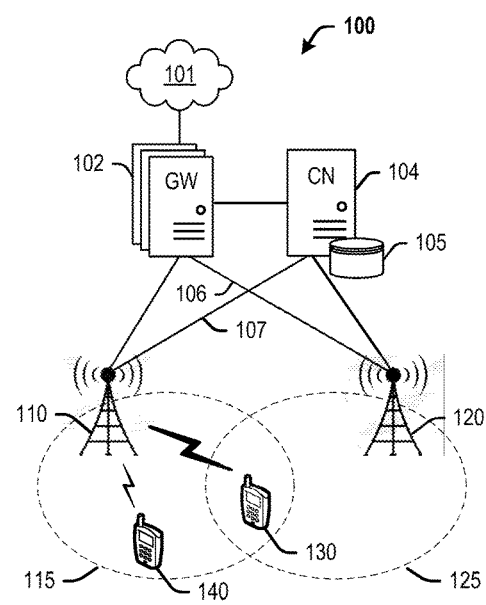
FIG. 1 depicts an exemplary system for limiting transit power in dense heterogeneous networks.

The following disclosure provides methods and systems for dynamically limiting uplink transmit power of wireless devices that are known to be within range of a dense cluster or quantity of access nodes. For example, wireless devices can scan frequencies of nearby access nodes and report identifiers (e.g. primary cell identifiers) to the wireless network. Responsive to determining a large quantity of identifiers from a wireless device in a specific location or coverage area, the maximum allowable transmit power of the wireless device (or other wireless devices in the same area) can be reduced. Thus, information reported by wireless devices can be leveraged to determine a density of access nodes in the area and reduce the uplink power of wireless devices in that area, thereby reducing the potential for uplink interference and/or noise levels.

Exemplary heterogeneous dual-connectivity wireless networks described herein include access nodes that are capable of communicating using a plurality of wireless air interfaces or RATs. For example, an access node can include a combination of a 4G eNodeB and a 5G gNodeB. In other words, the access node can be configured to communicate using 4G LTE as well using 5G NR. In some embodiments, the access node can include a 4G eNodeB coupled to a plurality of 5G gNodeBs (one-to-many or distributed configuration). In similar embodiments, the access nodes can be selected from either the eNodeB or one of the 5G gNodeBs. As further described herein, the access nodes can be part of the same or different cell sites or radio access networks (RANs), each RAN being served by a different cell site router. Thus, the communication channel for which the transmit power is adjusted can utilize two or more RATs, such that the density of access nodes that deploy at least one of the two or more RATs is determined, and the transmit power for wireless devices utilizing said at least one of the two or more RATs is adjusted. Different RAN configurations for EN-DC capable access nodes are described, with each RAN configuration enabling participation in dual-connectivity using at least two RATs. For example, each access node can include a primary access node configured to deploy carriers utilizing the a first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Therefore, a method as described herein for limiting power in dense heterogeneous networks includes monitoring a density of access nodes within range of one or more wireless devices, and adjusting a maximum allowable transmit power of the one or more wireless devices based on the density of access nodes. The density can be based on a quantity of access nodes as reported by the wireless devices, i.e. based on wireless devices scanning frequencies and reporting primary cell identifiers (PCIs) to the wireless networks. Alternatively or in addition, neighbor relations information obtained from access nodes serving a common service area in which the wireless devices are located can be utilized to determine the density of access nodes in proximity to the wireless devices.

Upon determining that the quantity meets a threshold, the maximum allowable transmit power can be reduced. In an exemplary embodiment, the maximum allowable transmit power is adjusted for high powered wireless devices, since these devices are more likely to cause interference in uplink communication channels. Further, high powered wireless devices are less likely to need to utilize their higher assigned transmit power when they are located in a dense cluster of access nodes, versus other high powered wireless devices that are closer to a cell edge or within range of only very few access nodes. Therefore, maximum allowable transmit power adjustment can be performed for high powered wireless devices first, and then standard or low powered wireless devices.

Further, a location of wireless devices can be monitored, and determining the density of access nodes and adjusting the transmit power can be repeated when the location changes. When the wireless device is within range of a threshold quantity of access nodes, the maximum allowable transmit power of the wireless device can be reduced. In an exemplary embodiment, when the wireless device is a high powered wireless device (i.e. assigned to a high power class), the maximum allowable transmit power can be reduced from 26 dBm to 23 dBm or lower. In an exemplary embodiment, when the wireless device is a standard or low powered wireless device (i.e. assigned to a standard power class), the maximum allowable transmit power can be reduced from 23 dBm to any lower value.

These and other embodiments are further described herein and with reference to FIGS. 1-10.

FIG. 1 depicts an exemplary system 100 comprising a communication network 101, gateway 102, controller node 104, access nodes 110 and 120, and wireless devices 130 and 140. In this exemplary embodiment, access nodes 110 and 120 may be macrocell access nodes configured to deploy wireless air interfaces to which wireless devices 130 and 140 can attach and access network services from network 101. Further, each of access nodes 110 and 120 may be configured to deploy at least two wireless air interfaces using dual connectivity. For example, access nodes 110 and 120 can include a combination of an eNodeB and a gNodeB, such that each access node 110, 120 is configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, each access node 110, 120 can be configured to communicate using both RATs at the same time. For example, dual connections can be set up with one or both of wireless devices 130, 140 using both 4G and 5G wireless air interfaces, with the 4G wireless air interface being used to transmit control information, and the 5G wireless air interface being used to transmit data information. Although only access nodes 110 and 120 and wireless devices 130, 140 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, the processing node is further is configured to perform operations for monitoring a density of access nodes within range of one or more of wireless devices 130, 140, and adjusting a maximum allowable transmit power of the one or more wireless devices 130, 140 based on the density of access nodes. The density can be based on a quantity of access nodes 110, 120 as reported by the wireless devices, i.e. based on wireless devices 130, 140 scanning frequencies and reporting primary cell identifiers (PCIs) to the wireless networks. Alternatively or in addition, neighbor relations information obtained from access nodes 110, 120 serving a common service area (i.e. between service areas 115, 125) in which the wireless devices 130, 140 are located can be utilized to determine the density of access nodes in proximity to the wireless devices 130, 140. For example, as illustrated herein, wireless device 130 would report proximity to both access nodes 110 and 120, while wireless device 140 would report proximity to only wireless device 130. Thus, upon determining that the quantity meets a threshold, the maximum allowable transmit power can be reduced.

Further, an exemplary method performed by system 100 can include determining that a wireless device 130, 140 is within range of a threshold quantity of access nodes 110, 120, and limiting a maximum allowable transmit power of the wireless device. Further, the maximum allowable transmit power for wireless device 130 is adjusted, since wireless device 130 is illustrated as being a high powered wireless device. Since high powered wireless devices are less likely to need to utilize their higher assigned transmit power when they are located in a dense cluster of access nodes, maximum allowable transmit power adjustment can be performed for high powered wireless devices first, and then standard or low powered wireless devices. In an exemplary embodiment, when the wireless device is a high powered wireless device (i.e. assigned to a high power class), the maximum allowable transmit power can be reduced from 26 dBm to 23 dBm or lower. In an exemplary embodiment, when the wireless device is a standard or low powered wireless device (such as wireless device 140), the maximum allowable transmit power can be reduced from 23 dBm to any lower value. Further, a location of wireless devices 130, 140 can be monitored, and determining the density of access nodes and adjusting the transmit power can be repeated when the location changes.

Access nodes 110, 120 can be any network node configured to provide communication between wireless devices 130 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Alternatively, access nodes 110, 120 may comprise any short range, low power, small-cell access node such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-3.

Wireless devices 130, 140 may be any device, system, combination of devices, or other such communication platform capable of communicating wirelessly with access nodes 110, 120 using one or more frequency bands deployed therefrom. Wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be direct links or might include various equipment, intermediate components, systems, and networks, such as a cell site router, etc. Communication links 106, 107 may comprise many different signals sharing the same link. Communication links 106, 107 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as locations of wireless devices 130, 140, correlations of locations with density of access nodes 110, 120, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, gateway(s) 102, controller node 104, and/or network 101.

Figure 2:
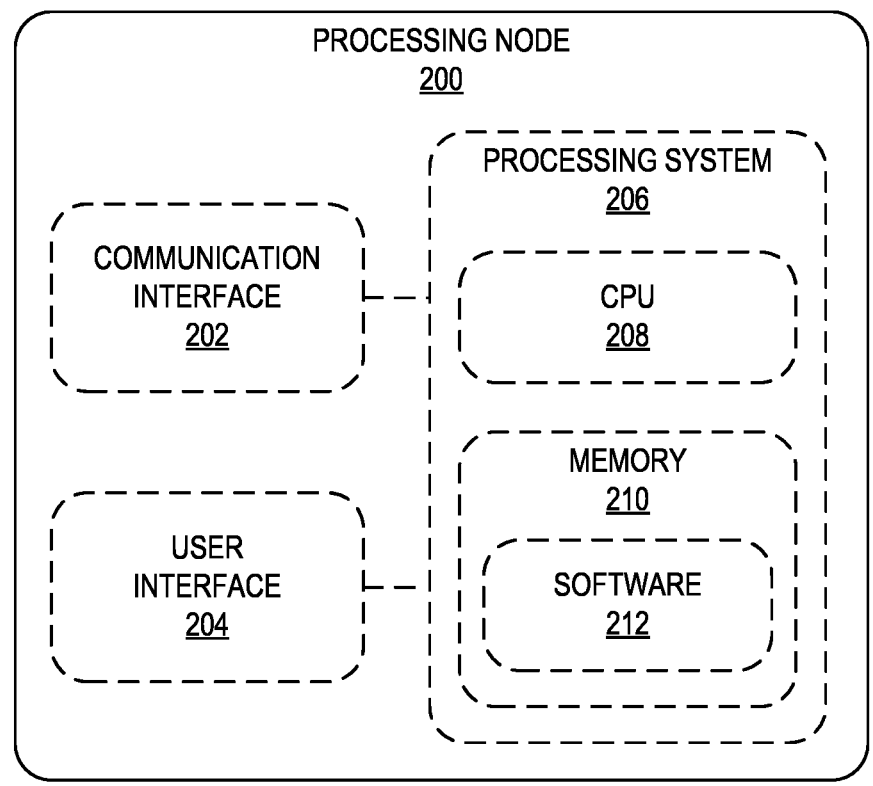
FIG. 2 depicts an exemplary processing node for limiting transit power in dense heterogeneous networks.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for mitigating interference in heterogeneous networks by monitoring a density of access nodes within range of one or more wireless devices, and adjusting a maximum allowable transmit power of the one or more wireless devices based on the density of access nodes. In another exemplary embodiment, software 212 can include instructions for limiting transmit power of wireless devices in dense heterogeneous networks by determining that a wireless device is within range of a threshold quantity of access nodes, and limiting a maximum allowable transmit power of the wireless device. In another exemplary embodiment, software 212 can include instructions for limiting transmit power based on a density of access nodes in a wireless network by identifying a high powered wireless device in a wireless network, determining that a quantity of access nodes within range of the high powered wireless device meets a threshold, and reducing a maximum allowable transmit power of the high powered wireless device. In an exemplary embodiment, software 212 can include instructions for limiting uplink interference by monitoring a density of access nodes within range of a wireless device, and upon the density meeting a threshold, reducing a maximum allowable transmit power of the wireless device. The maximum allowable transmit power may be reduced based on a capability of the wireless device, i.e. whether the wireless device is a high powered wireless device, or a standard powered (or low powered) wireless device.

Figure 3:
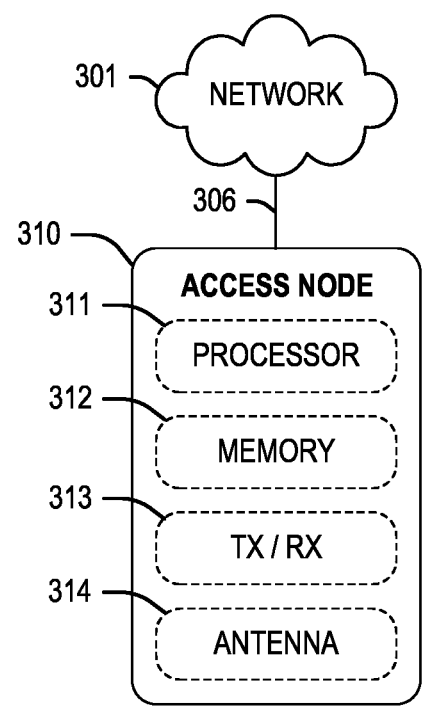
FIG. 3 depicts an exemplary access node for limiting transit power in dense heterogeneous networks.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for mitigating interference in heterogeneous networks by monitoring a density of access nodes within range of one or more wireless devices, and adjusting a maximum allowable transmit power of the one or more wireless devices based on the density of access nodes. In another exemplary embodiment, memory 312 can include instructions for limiting transmit power of wireless devices in dense heterogeneous networks by determining that a wireless device is within range of a threshold quantity of access nodes, and limiting a maximum allowable transmit power of the wireless device. In another exemplary embodiment, memory 312 can include instructions for limiting transmit power based on a density of access nodes in a wireless network by identifying a high powered wireless device in a wireless network, determining that a quantity of access nodes within range of the high powered wireless device meets a threshold, and reducing a maximum allowable transmit power of the high powered wireless device. In an exemplary embodiment, memory 312 can include instructions for limiting uplink interference by monitoring a density of access nodes within range of a wireless device, and upon the density meeting a threshold, reducing a maximum allowable transmit power of the wireless device. The maximum allowable transmit power may be reduced based on a capability of the wireless device, i.e. whether the wireless device is a high powered wireless device, or a standard powered (or low powered) wireless device.

Figure 4:
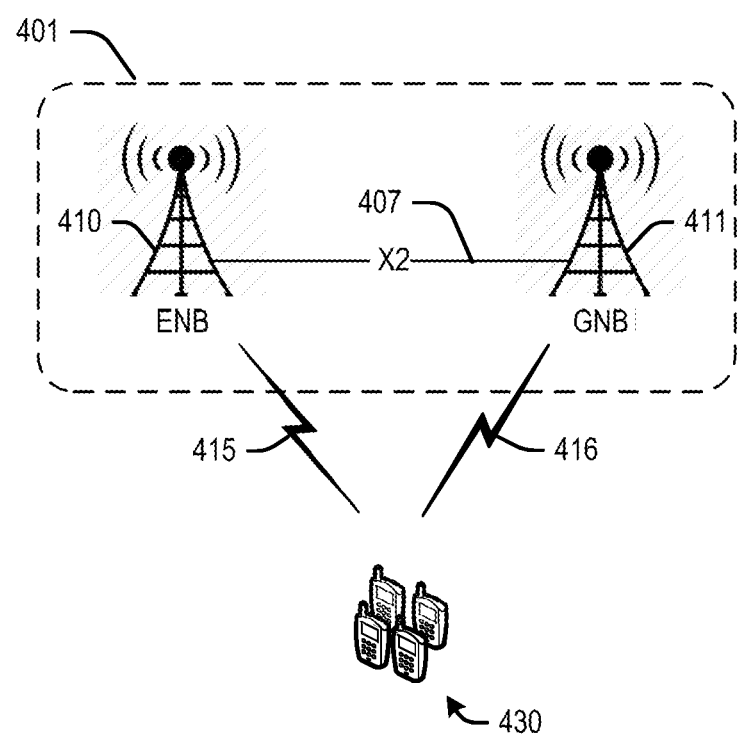
FIG. 4 depicts an exemplary collocated access node in a dual-connectivity network.

FIG. 4 depicts an exemplary collocated 5G EN-DC radio access network (RAN) 401. RAN 401 includes colocated access nodes 410, 411, and may include other components not shown herein for convenience, such as cell site routers, controllers, etc. Further, RAN 401 may be connected to other intermediate or core networks. In this exemplary embodiment, access node 410 can include a eNodeB, and access node 411 can include a gNodeB. For example, access node 410 can be configured to deploy a wireless interface 415 using a first radio access technology (RAT), e.g. 4G LTE, and access node 411 can be configured to deploy a second wireless interface 416 using a second RAT, e.g. 5G NR. Each RAT can be configured to utilize a different frequency band or sub-band, a different channel size or bandwidth, and so on. For example, the 5G NR wireless interface 416 can be configured to utilize higher frequencies and larger channel bandwidths than the 4G LTE wireless interface 415.

Further, access nodes 410, 411 can be configured to communicate using both RATs at the same time. For example, dual connections can be set up with any of wireless devices 430 using both 4G and 5G air interfaces 415, 416, the 4G wireless interface 415 being used to transmit control information, and the 5G wireless interface 416 being used to transmit data information. For example, a processing node within RAN 401 (for example, communicatively coupled to access nodes 410, 411, or any other network node) can be configured to determine whether or not wireless devices 430 are capable of communicating using both RATs (e.g. capable of 5G EN-DC), and instruct the access node 410 to broadcast an indicator in, for example, a system information message. Responsive to the indicator, wireless devices 430 can attach to access node 410 which can use the 4G carrier to control and set up a dual connectivity session with the wireless devices 430. In other words, control information (including SIB messages) is transmitted from the access node 410 using the 4G LTE air interface, while the 5G NR air interface is utilized for transmission of data via access node 411. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. Further, within radio access network 402, access nodes 410 and 411 can be coupled via a direct communication link 407, which can include an X2 communication link. Access nodes 410 and 411 can communicate control and data information across X2 communication link 407. In an exemplary embodiment, access node 411 includes logic to determine how to allocate data packets between access node 410 and access node 411, wherein the data packets flow between wireless devices 430 and any external network node. Such logic may include a packet data convergence protocol (PDCP) function. Thus, RAN 401 can include a plurality of antenna elements (not shown herein) coupled to access nodes 410 and 411, with different antenna elements configured to deploy a different radio air interface using a different frequency.

Further, the processing node within RAN 401 can be configured to perform operations for dynamically limiting uplink transmit power of wireless devices 430 based on a density or quantity of access nodes 410, 411 (or others not shown herein). For example, wireless devices 430 can scan frequencies of nearby access nodes and report identifiers (e.g. primary cell identifiers) to RAN 401. Responsive to determining a large quantity of identifiers from a wireless device 430 in a specific location or coverage area, the maximum allowable transmit power of the wireless device 430 (or other wireless devices in the same area) can be reduced. Thus, information reported by wireless devices 430 can be leveraged to determine a density of access nodes 410, 411 in the area and reduce the uplink power of wireless devices 430 in that area based thereon, thereby reducing the potential for uplink interference and/or noise levels. Further, the maximum allowable transmit power for wireless devices 430 can be adjusted based on a power class of the wireless devices. Since high powered wireless devices are less likely to need to utilize their higher assigned transmit power when they are located in a dense cluster of access nodes, maximum allowable transmit power adjustment can be performed for high powered wireless devices first, and then standard or low powered wireless devices. Alternatively or in addition, it may be determined that there are no high powered wireless devices among wireless devices 430, or that the quantity of high powered wireless devices is below a threshold. In this case, the power adjustment is performed for any wireless device, including standard or low powered wireless devices.

Figure 5:
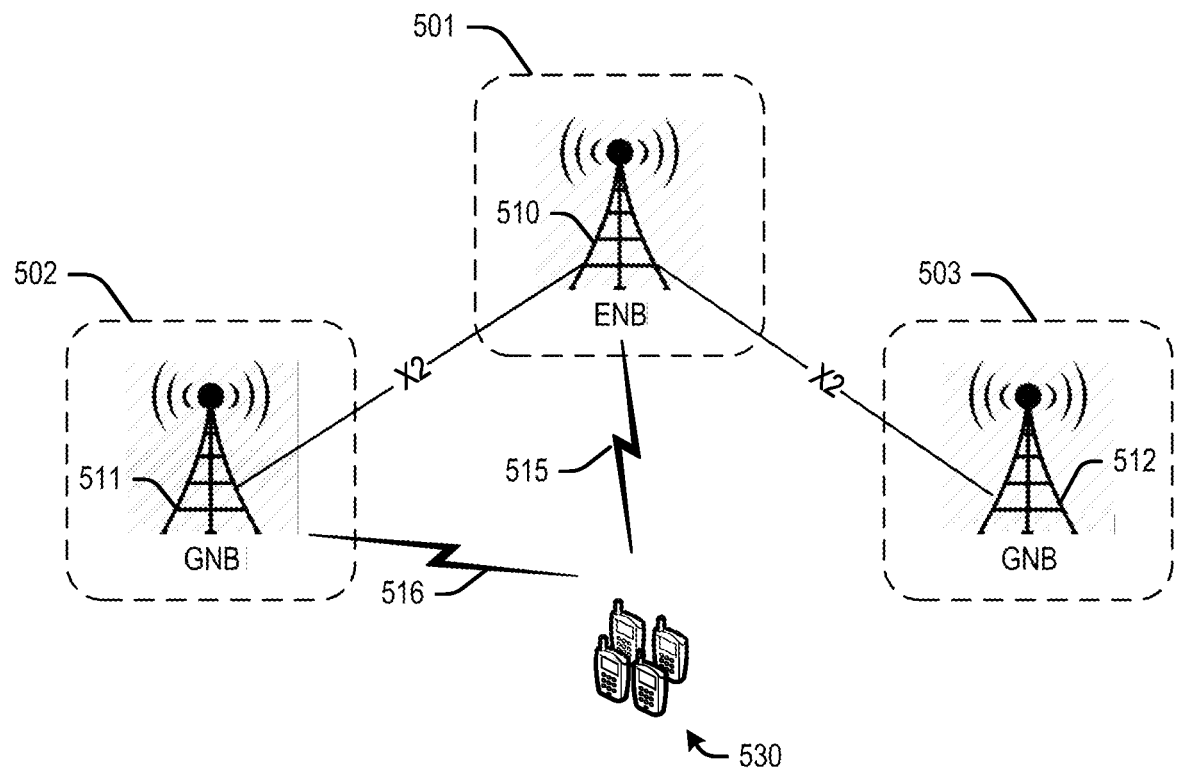
FIG. 5 depicts exemplary distributed access nodes in a dual-connectivity network.

FIG. 5 depicts reference signal reporting adjustment performed in an exemplary distributed 5G EN-DC system. Each of RANs 501, 502, 503 includes at least access nodes 510, 511, 512 respectively. This embodiment depicts a one-to-many configuration, in which an eNodeB 510 is designated as a primary access node for wireless devices 530, and one or more gNodeBs 511, 512 are selected as secondary access nodes, as further described below. Persons having ordinary skill in the art may note that other components may be included in any combination, without materially affecting the scope and spirit of the described embodiments.

In this exemplary embodiment, access node 510 can include an eNodeB, and access nodes 511, 512 can include gNodeBs. For example, access node 510 can be configured to deploy a wireless interface 515 using a first radio access technology (RAT), e.g. 4G LTE, and access nodes 511, 512 can be configured to deploy wireless interfaces using a second RAT, e.g. 5G NR. Further, access nodes 510, 511, 512 can be configured to communicate using both RATs at the same time. For example, dual connections can be set up with wireless devices 530 using both 4G and 5G air interfaces respectively, the 4G wireless interface 515 being used to transmit control information, and one of the 5G wireless interfaces (e.g. 5G interface 516) being used to transmit data information. For example, a processing node communicatively coupled to access node 510 can be configured to determine whether or not wireless devices 530 are capable of communicating using both RATs (e.g. capable of 5G EN-DC), and instruct the access node 510 to broadcast an indicator in, for example, a system information message. Responsive to the indicator, wireless devices 530 can attach to access node 510 which can use the 4G carrier to control and set up a dual connectivity session with wireless devices 530. Further, access node 510 can be configured to select one (or more) of access nodes 511, 512 as a secondary access node, to transport user data. In other words, control information (including SIB messages) is transmitted from the access node 510 using the 4G LTE air interface, while the 5G NR air interfaces (e.g. 5G NR air interface 516) is utilized for transmission of data. Further, access nodes 511 and 512 (hereinafter "secondary access nodes") can each be coupled to access node 510 (hereinafter "primary access node") via X2 communication links. In an exemplary embodiment, each secondary access node 511, 512 can include logic to determine how to allocate data packets between the access nodes, wherein the data packets flow between wireless devices 530 and a network node not shown herein. Such logic may include a packet data convergence protocol (PDCP) function.

Further, a processing node communicatively coupled to any of access nodes 510, 511, 512 can be configured to perform operations for dynamically limiting uplink transmit power of wireless devices 530 based on a density or quantity of access nodes 510, 511, 512 (or others not shown herein). For example, wireless devices 530 can scan frequencies of nearby access nodes and report identifiers (e.g. primary cell identifiers) to RAN 501 (or any of RANs 501-503). Responsive to determining a large quantity of identifiers from a wireless device 530 in a specific location or coverage area, the maximum allowable transmit power of one or more wireless devices 530 (or other wireless devices in the same area) can be reduced. Thus, information reported by wireless devices 530 can be leveraged to determine a density of access nodes 510-512 in the area and reduce the uplink power of any of wireless devices 530 in that area based thereon, thereby reducing the potential for uplink interference and/or noise levels. Further, the maximum allowable transmit power for wireless devices 530 can be adjusted based on a power class of the wireless devices. Since high powered wireless devices are less likely to need to utilize their higher assigned transmit power when they are located in a dense cluster of access nodes, maximum allowable transmit power adjustment can be performed for high powered wireless devices first, and then standard or low powered wireless devices. Alternatively or in addition, it may be determined that there are no high powered wireless devices among wireless devices 530, or that the quantity of high powered wireless devices is below a threshold. In this case, the power adjustment is performed for any wireless device, including standard or low powered wireless devices.

Figure 6:
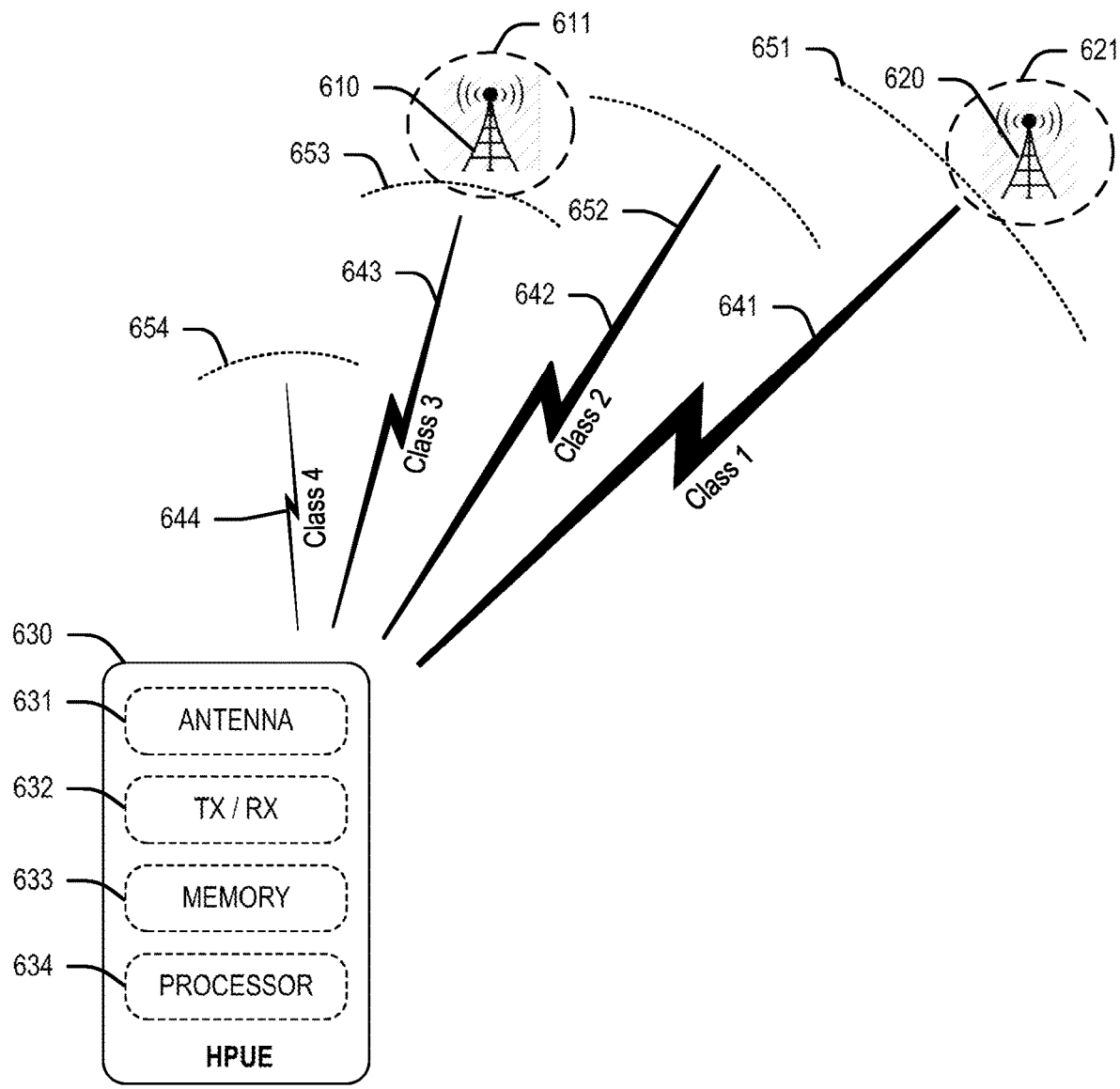
FIG. 6 depicts an exemplary high powered wireless device.

FIG. 6 depicts an exemplary wireless device 630 capable of transmission in several power classes. As noted above, wireless devices can be configured as different power class wireless devices (e.g., high-power wireless devices and/or standard-power wireless devices as well as low-power wireless devices). Wireless device 630 is therefore equipped with an appropriate antenna 631 and transceiver 632 enabling increased transmit power from wireless device 630 to one or more access node 610, 620. For example, wireless device 630 is capable of operating in a transmission mode utilizing power class 1, to transmit an uplink transmission 641 at a range 651. Wireless device 630 may further switch transmission modes to utilizing power class 2 to transmit uplink transmission 642 at a range 652, utilizing power class 3 to transmit uplink transmission 643 at a range 653, and utilizing power class 4 to transmit uplink transmission 644 at a range 654. Antenna 631 and transceiver 632 are appropriately configured to utilize these differently-powered transmission modes. Further, memory 633 can include instructions for transmitting to a network identifiers of access nodes within range of wireless device 630 (including access nodes 610, 620), and receive an instruction to lower a transmit power (or reduce a power class) if the density of access nodes is determined to be higher than a threshold. Moreover, controlling the transmit power level or changing the power class of wireless device 630 can be performed by setting a maximum uplink transmission power value allowed by a serving access node to be equal to a standard maximum uplink transmission power value, and broadcasting the maximum uplink transmission power value to the wireless device via, for example, a system information message, or radio resource control (RRC) message.

Figure 7:
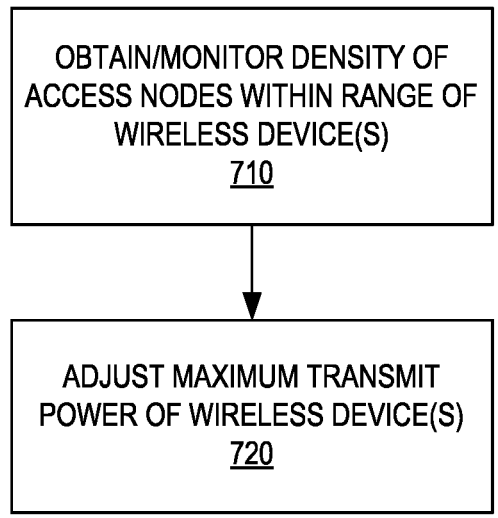
FIG. 7 depicts an exemplary method for limiting transit power in dense heterogeneous networks.

FIG. 7 depicts an exemplary method for limiting transmit power in dense heterogeneous wireless networks. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a density of access nodes within range of one or more wireless devices is obtained and/or monitored and, at 720, the maximum transmit power of the one or more wireless devices is adjust as described herein. The density can be based on a quantity of access nodes as reported by the wireless devices, i.e. based on wireless devices scanning frequencies and reporting primary cell identifiers (PCIs) to the wireless networks. Alternatively or in addition, neighbor relations information obtained from access nodes serving a common service area in which the wireless devices are located can be utilized to determine the density of access nodes in proximity to the wireless devices. Upon determining that the quantity meets a threshold, the maximum allowable transmit power can be reduced. In an exemplary embodiment, the maximum allowable transmit power is adjusted for high powered wireless devices, since these devices are more likely to cause interference in uplink communication channels. Further, high powered wireless devices are less likely to need to utilize their higher assigned transmit power when they are located in a dense cluster of access nodes, versus other high powered wireless devices that are closer to a cell edge or within range of only very few access nodes. Therefore, maximum allowable transmit power adjustment can be performed for high powered wireless devices first, and then standard or low powered wireless devices.

Figure 8:
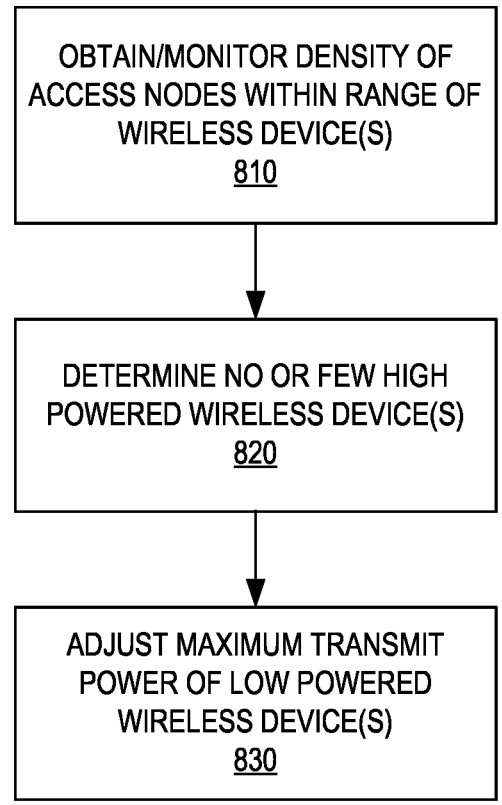
FIG. 8 depicts another exemplary method for limiting transit power in dense heterogeneous networks.

FIG. 8 depicts an exemplary method for limiting transmit power in dense heterogeneous wireless networks. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a density of access nodes within range of one or more wireless devices is obtained and/or monitored. The density can be based on a quantity of access nodes as reported by the wireless devices, i.e. based on wireless devices scanning frequencies and reporting primary cell identifiers (PCIs) to the wireless networks. Alternatively or in addition, neighbor relations information obtained from access nodes serving a common service area in which the wireless devices are located can be utilized to determine the density of access nodes in proximity to the wireless devices. At 820, it is determined that there are no high powered wireless devices among the wireless devices, or that the quantity of high powered wireless devices is below a threshold. Thus, at 830, power adjustment is performed for any wireless device, including standard or low powered wireless devices. For example, upon determining that the quantity meets a threshold, the maximum allowable transmit power can be reduced. In an exemplary embodiment, when the wireless device is a standard or low powered wireless device (i.e. assigned to a standard power class), the maximum allowable transmit power can be reduced from 23 dBm to any lower value.

Figure 9:
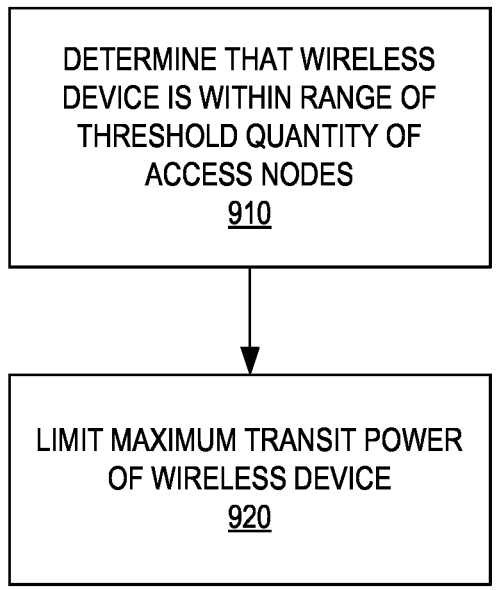
FIG. 9 depicts another exemplary method for limiting transit power in dense heterogeneous networks.

FIG. 9 depicts an exemplary method for limiting transmit power in dense heterogeneous wireless networks. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, it is determined that a wireless device is within range of a threshold quantity of access nodes and, at 920, a maximum transmit power of the wireless devices is limited as described herein.

Figure 10:
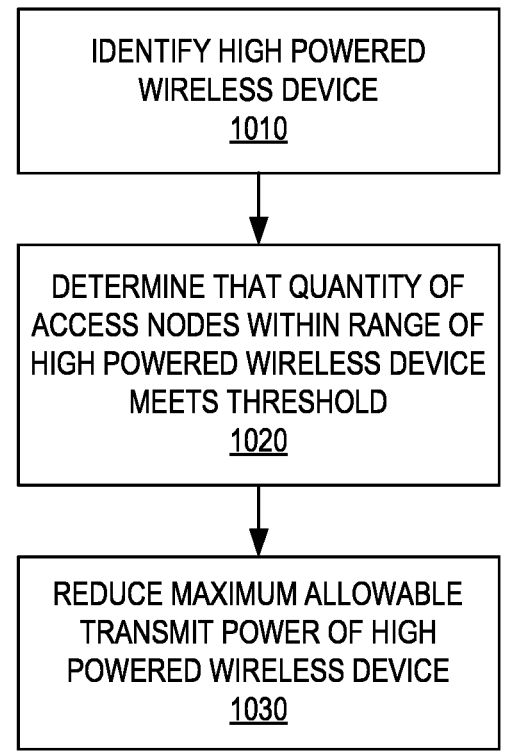
FIG. 10 depicts another exemplary method for limiting transit power in dense heterogeneous networks.

FIG. 10 depicts an exemplary method for limiting transmit power in dense heterogeneous wireless networks. The method of FIG. 10 may be implemented by a processing node communicatively coupled to one or more access nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, high powered wireless devices are identified as being within range of one or more access nodes. The high powered wireless devices may be identified based on a device capability or power class based on a unique device identifier. At 1020, it is determined that a quantity of the one or more access nodes meets or exceeds a threshold. Thus, at 1030, a maximum allowable transmit power of the high powered wireless device is reduced. In an exemplary embodiment, when the wireless device is a high powered wireless device (i.e. assigned to a high power class), the maximum allowable transmit power can be reduced from 26 dBm to 23 dBm or lower.

While 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described adjustment of maximum allowable transmit power based on density of access nodes is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in heterogeneous networks, the method comprising:
   monitoring a density of access nodes within range of one or more wireless devices;
   determining that there are no high powered wireless devices from among the one or more wireless devices;
   lowering the maximum allowable transmit power of one or more low powered wireless devices;
   periodically obtaining locations of the one or more wireless devices; and
   repeating the monitoring and adjusting operations when the locations change.

2. The method of claim 1, wherein the density is based on a quantity of access nodes within range of the one or more wireless devices.

3. The method of claim 2, further comprising determining the quantity based on identifiers reported by the one or more wireless devices.

4. The method of claim 2, further comprising determining the quantity based on neighbor relations information associated with the access nodes.

5. The method of claim 1, further comprising:
   determining that the density of access nodes meets a threshold; and
   lowering the maximum allowable transmit power of at least one of the one or more wireless devices.

6. The method of claim 5, further comprising:
   identifying high powered wireless devices from among the one or more wireless devices; and
   lowering the maximum allowable transmit power of the high powered wireless devices.

7. The method of claim 6, wherein lowering the maximum allowable transmit power of the high powered wireless devices comprises reducing the maximum allowable transmit power from 26 dBm to 23 dBm or lower.

8. A processing node for limiting transmit power based on a density of access nodes in a wireless network, the processing node being configured to perform operations comprising,
   identifying one or more wireless devices as high powered wireless devices;
   determining that a density of access nodes within range of the high powered wireless device meets a access node density threshold;
   reducing a maximum allowable transmit power of the high powered wireless device;
   determining that a quantity of one or more wireless devices are not high powered wireless devices; and
   reducing the maximum allowable transmit power of the quantity of one or more wireless devices when the quantity is below a high powered device threshold.

9. The processing node of claim 8, wherein the maximum allowable transmit power of the high powered wireless device is reduced from 26 dBm to 23 dBm or lower.

10. The processing node of claim 8, wherein the density is based on a quantity of access nodes within range of the one or more wireless devices.

11. The processing node of claim 10, wherein the operations further comprise determining the quantity based on identifiers reported by the one or more wireless devices.

12. The processing node of claim 11, wherein the identifier comprises a primary cell identifier.

13. The processing node of claim 8, wherein the density is based on neighbor relations information associated with the access nodes.

* * * * *